(12) United States Patent
Connor

(10) Patent No.: US 7,814,219 B2
(45) Date of Patent: Oct. 12, 2010

(54) METHOD, APPARATUS, SYSTEM, AND ARTICLE OF MANUFACTURE FOR GROUPING PACKETS

(75) Inventor: Patrick L. Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1795 days.

(21) Appl. No.: 10/741,030

(22) Filed: Dec. 19, 2003

(65) Prior Publication Data

US 2005/0138190 A1 Jun. 23, 2005

(51) Int. Cl.
*G06F 15/16* (2006.01)
*G06F 3/00* (2006.01)
(52) U.S. Cl. .................................. 709/230; 719/321
(58) Field of Classification Search .......... 709/201, 709/226, 230, 249; 370/230.1, 412, 392; 719/321, 322
See application file for complete search history.

(56) References Cited

U.S. PATENT DOCUMENTS

| | | | |
|---|---|---|---|
| 5,485,460 A | | 1/1996 | Schrier et al. |
| 6,618,397 B1 * | | 9/2003 | Huang .................... 370/474 |
| 6,948,108 B1 * | | 9/2005 | Ludwig et al. .......... 714/748 |
| 6,957,281 B2 * | | 10/2005 | Mann et al. .................. 710/5 |
| 2002/0144004 A1 | | 10/2002 | Gaur et al. |
| 2003/0135667 A1 | | 7/2003 | Mann et al. |
| 2003/0235194 A1 * | | 12/2003 | Morrison ................. 370/389 |

FOREIGN PATENT DOCUMENTS

| EP | 0 982 909 | 3/2000 |
|---|---|---|
| EP | 1 359 724 | 11/2003 |

OTHER PUBLICATIONS

"The Layered Approach: The Osi Model", *Data and Computer Communications*, 1991, pp. 446-456.
PCT Search Report and Written Opinion, Mar. 3, 2005, for International Patent Application No. PCT/US2004/040387.
International Preliminary Report on Patentability (IPRP), Jun. 29, 2006, for International Application No. PCT/US2004/040387, 8 pp.
Office Action 1, Mar. 6, 2009, for Application No. CN200480037040.8, 15 pp. [with Translation].
Office Action 1, Dec. 16, 2008, for Application No. DE112004002378.5-31, 5 pp. [with Translation].
Office Action 1, Sep. 6, 2006, for Application No. TW93138130, 3 pp. [with Translation].

(Continued)

*Primary Examiner*—Yemane Mesfin
(74) *Attorney, Agent, or Firm*—Konrad Raynes & Victor LLP; Rabindranath Dutta

(57) ABSTRACT

In certain embodiments, a first unit receives a plurality of packets, wherein the plurality of packets are capable of being processed according to at least a first protocol and a second protocol. The first unit sorts the plurality of packets into a first group and a second group, wherein all packets in the first group are capable of being processed according to the first protocol, and all packets in the second group are capable of being processed according to the second protocol. The first unit sends the first group and the second group to a second unit.

17 Claims, 6 Drawing Sheets

OTHER PUBLICATIONS

Office Action 2, Nov. 6, 2009, for Application No. CN200480037040.8, 10 pp. [with Translation].
Office Action 2, May 22, 2009, for Application No. DE112004002378.5-31, 4 pp. [with Translation].
Response to Office Action 1, Aug. 7, 2009, for Application No. CN200480037040.8, 39 pp.
Response to Office Action 1, May 11, 2009, for Application No. DE112004002378.5-31, 18 pp.
Response to Office Action 1, Nov. 28, 2006, for Application No. TW93138130, 2 pp.
Response to Office Action 2, Jan. 19, 2010, for Application No. CN200480037040.8, 5 pp.
Response to Office Action 2, Jun. 24, 2009, for Application No. DE112004002378.5-31, 6 pp.
Office Action 3, Mar. 26, 2010, for Application No. CN200480037040.8, 9 pp. [with Translation].

* cited by examiner

METHOD, APPARATUS, SYSTEM, AND ARTICLE OF MANUFACTURE FOR GROUPING PACKETS

BACKGROUND

1. Field

The disclosure relates to a method, apparatus, system, and article of manufacture for grouping packets.

2. Background

A network may be a system for communication between a plurality of devices. In networking, a communications protocol or a network protocol may be the specification of a set of rules for a particular type of communication. Different protocols may describe different aspects of a single communication. Taken together, the different protocols that describe different aspects of the single communication may form a protocol stack.

Computer networks may be implemented using a variety of protocol stack architectures, where a protocol stack is a particular software implementation of a computer networking protocol suite. A protocol stack may have a plurality of protocol modules. The protocol modules may be referred to as protocol layers in the protocol stack.

For example, a protocol stack may include a Transmission Control Protocol (TCP) layer running over an Internet Protocol (IP) layer, where the IP layer runs over an Ethernet layer. Operating systems may have software interfaces between various layers of protocol stacks. For example, the Microsoft Windows* operating system has the Network Driver Interface Specification (NDIS) interface. The NDIS interface may define a plurality of Application Programming Interfaces (API) for devices, such as, Network Interface cards (NIC). The NDIS APIs may be used for integrating protocol drivers and device drivers. Other operating systems may have other software interfaces for various layers of protocol stacks.

Microsoft Windows is a trademark of Microsoft Corp.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
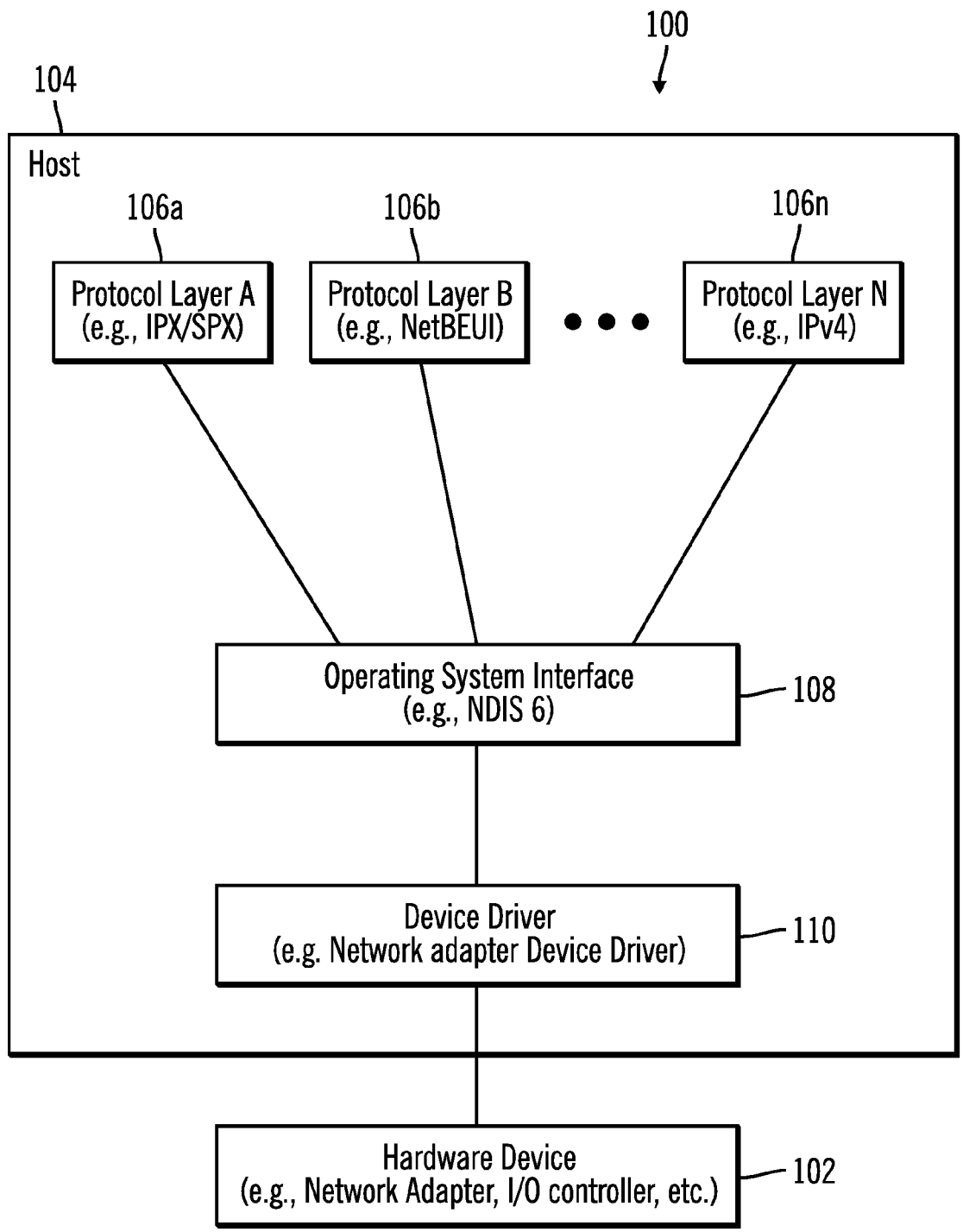
FIG. 1 illustrates a computing environment in which certain embodiments are implemented.

FIG. 1 illustrates a computing environment 100 in which certain embodiments are implemented. A hardware device 102 is coupled to a host 104. While in the computing environment 100 the hardware device 102 is shown external to the host 104, in alternative embodiments the hardware device 102 may be internal to the host 104. The hardware device 102 may include any hardware device, such as, a network adapter, an I/O controller, a storage device, a modem, etc., that is capable of interfacing with the host 104 by sending and receiving packets. While a single hardware device 102 in shown coupled to the host 104, in certain alternative embodiments a plurality of hardware devices may be coupled to the host 104. The host 104 may be a computational platform, such as, a personal computer, a workstation, a server, a mainframe, a hand held computer, a palm top computer, a telephony device, a network appliance, a blade computer, etc.

The host 104 may include one or more protocol layers 106a . . . 106n, an operating system interface 108, and a device driver 110. The host may 104 may include additional components (not shown) such as a processor, a memory, and an operating system.

In certain embodiments, the protocol layers 106a . . . 106n , may include any protocol layer, such as, Internet Packet Exchange/Sequential Packet exchange (IPX/SPX*), NetBios Extended User Interface (NetBEUI*), Internet Protocol Version 4 (IPv4), etc. IPX/SPX is a local-area network communications protocol that exchanges information between network clients, applications, and network peripherals. NetBEUI is an enhanced version of the NetBIOS protocol used by various network operating systems. IPv4 is an Internet Protocol over which other protocols, such as, the Transmission Control Protocol (TCP), can run. Additional protocol layers such as Internet Protocol version 6 (IPv6) may also be included in the protocol layers 106a . . . 106n.

IPX and SPX are trademarks of Novell, Inc.

NetBEUI is a trademark of International Business Machines Corp.

In certain embodiments the operating system interface 108 may include an NDIS 6 interface or other interfaces. The operating system interface 108 may be used for interfacing the protocol layers 106a . . . 106n with the device driver 110. In certain embodiments, the operating system interface 108 may include APIs capable of processing groups of packets.

The device driver 110 may be a program that controls the hardware device 102. The device driver 110 may act like a translator between the hardware device 102 and the operating system interface 108. The device driver 110 may accept commands from the operating system interface 108 and translate the accepted commands into specialized commands for the hardware device 102. In certain embodiments, in which the hardware device 102 is a network adapter, the device driver 110 may be a driver for the network adapter.

FIG. 1 illustrates an embodiment in which the device driver 110 allows data and commands to be exchanged between the operating system interface 108 and the hardware device 102, where the operating system interface 108 may allow data and commands to be exchanged for a plurality of protocol layers 106a . . . 106n.

Figure 2:
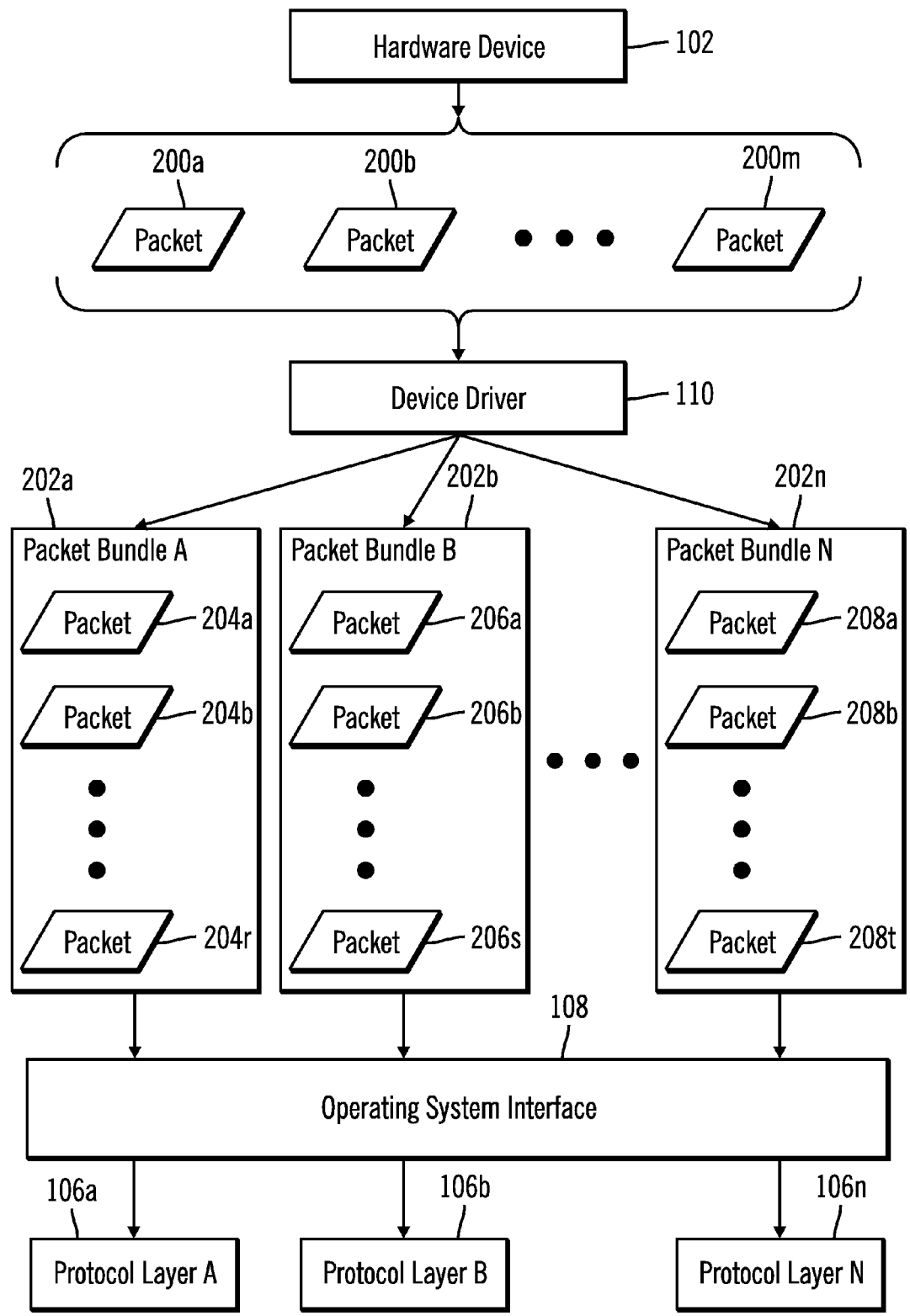
FIG. 2 illustrates how packets may be sorted in the computing environment illustrated in FIG. 1.

FIG. 2 illustrates how packets may be sorted in the computing environment 100 illustrated in FIG. 1. The hardware device 102, such as a network adapter or an I/O controller, receives a plurality of packets 200a . . . 200m. In certain embodiments, the packets 200a . . . 200m may arrive at the hardware device 102 over a network (not shown), such as, a local area network, a wide area network, the Internet, an intranet, etc.

The hardware device 102 sends the packets 200a . . . 200m to the device driver 110. The packets 200a . . . 200m may be sent in the same order in which the packets are received by the hardware device 102. In certain embodiments, where packet order is not important, the packets 200a . . . 200m may be sent in a different order than the order in which the packets are received by the hardware device 102. However, packet order is maintained within any end-to-end communication, such as, a TCP connection. Furthermore, the hardware device 102 may sent a packet to the device driver 110, in response to the packet arriving at the hardware device 102 or may wait for a plurality of packets to arrive at the hardware device 102 before sending the plurality of packets to the device driver 110.

In association with a packet 200a . . . 200m that is sent by the hardware device 102, the hardware device 102 may indicate a protocol layer that is capable of processing the packet 200a . . . 200m. For example, the hardware device 102 may send packet 200a to the device driver 110 and indicate that packet 200a is capable of being processed by an IPX/SPX protocol layer, such as protocol layer A 106a. In alternative embodiments, a packet 200a . . . 200m may include information on the protocol layer that is capable of processing the packet 200a . . . 200m, and the hardware device 102 may not indicate the protocol layer of a packet while sending the packet to the device driver 110.

The device driver 110 receives the packets 200a . . . 200m from the hardware device 102 and sorts the packets into one or more packet bundles 202a . . . 202n corresponding to the protocol layers 106a . . . 106n. For example, packet bundle A 202a may include the packets 204a . . . 204r that are capable of being processed by protocol layer A 106a, packet bundle B 202b may include the packets 206a . . . 206s that are capable of being processed by protocol layer B 106b, and packet bundle N 202n may include the packets 208a . . . 208t that are capable of being processed by protocol layer N 106n, where the packets 204a . . . 204r, 206a . . . 206s, 208a . . . 208t correspond to the packets 200a . . . 200m that are received by the device driver 110. All packets included in a packet bundle are capable of being processed by a single protocol layer. For example, all packets included in the packet bundle A 202 are capable of being processed by the protocol layer A 106a, all packets in the packet bundle B 202b are capable of being processed by the protocol layer B 106b, and all packets in the packet bundle N 202n are capable of being processed by the protocol layer N 106n.

The device driver 110 sends the packet bundles 202a . . . 202n to the operating system interface 108. The operating system interface 108 forwards the packet bundles 202a . . . 202n to the corresponding protocol layer 106a . . . 106n for processing. For example, in certain embodiments the operating system interface 108 may send the packet bundle A 202a to the protocol layer A 106a, the packet bundle B 202b to the protocol layer B 106b, the packet bundle N 202n to the protocol layer N 106n. Packet order is maintained within any end-to-end communication, such as, a TCP connection, by both the device driver 110 and the operating system interface 108.

For example, in certain embodiments if the packets 200a . . . 200m can collectively be processed by the IPX/SPX, NetBEUI and IPv4 protocol layers, then the device driver 110 may sort the packets 200a . . . 200m into packets bundles corresponding to the IPX/SPX, NetBEUI and IPv4 protocol layers. In certain embodiments, the device driver 110 may adopt various strategies that take into consideration the latency for processing packets in deciding the number of packets to bundle in a packet bundle 202a . . . 202n.

The operating system interface 108 may forward the packets in the packet bundle corresponding to the IPX/SPX protocol layer to be processed by the IPX/SPX protocol layer. Additionally, the operating system interface 108 forwards the packets in the packet bundle corresponding to the NetBEUI protocol layer to be processed by the NetBEUI protocol layer and further forwards the packets in the packet bundle corresponding to the IPv4 protocol layer to be processed by the IPv4 layer.

FIG. 2 illustrates certain embodiments in which the device driver 110 sorts incoming packets into one or more packet bundles, where a packet bundle includes packets that are capable of being processed by the same protocol. The device driver 110 sends the packet bundles to the operating system interface 108, such as the NDIS 6 interface. The operating system interface 108 may send the packet bundles to the corresponding protocol layers for further processing.

Figure 3:
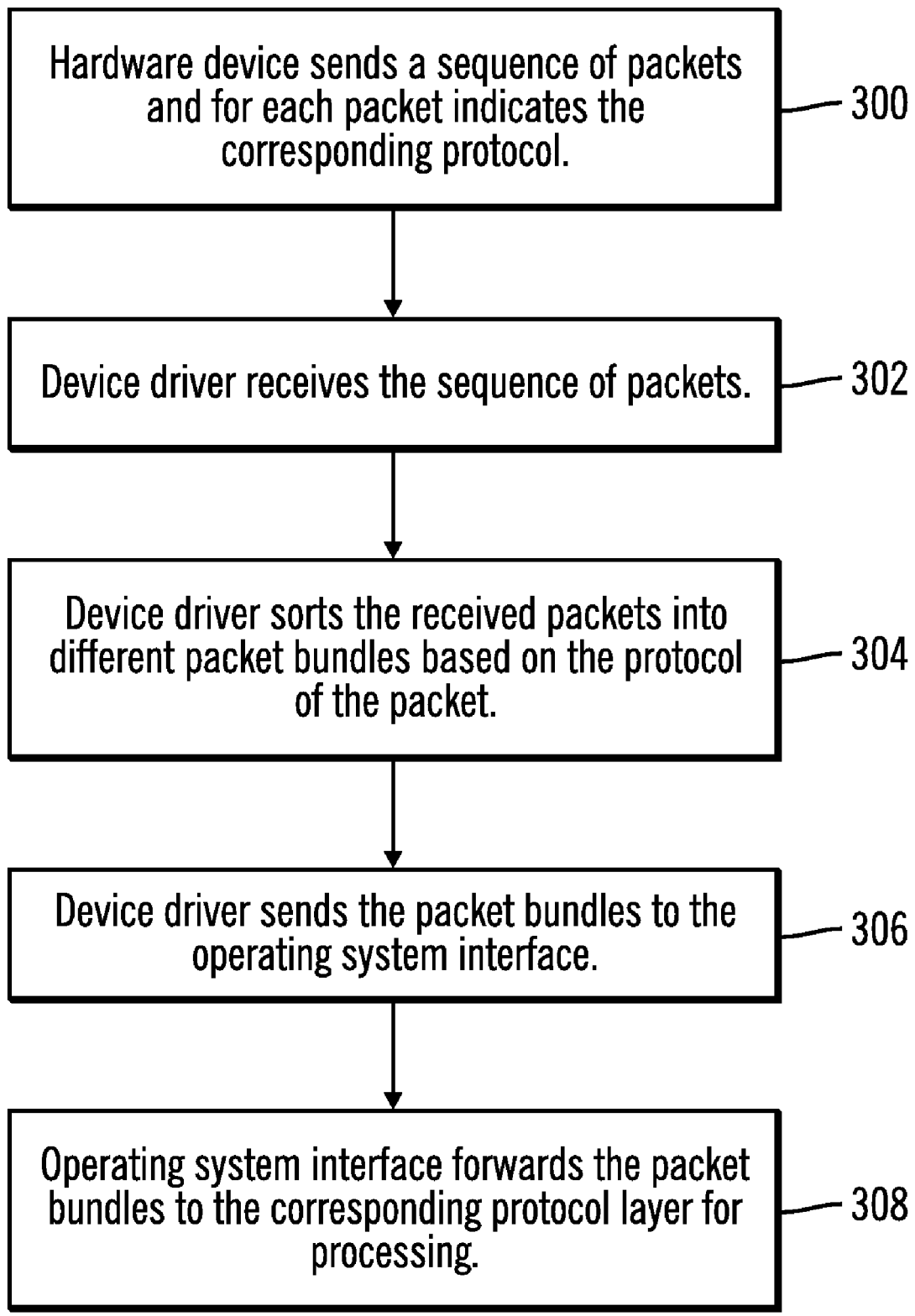
FIG. 3 illustrates operations for grouping packets described with respect to FIGS. 1-2, in accordance with certain embodiments.

FIG. 3 illustrates operations for grouping the packets 200a . . . 200m described with respect to FIGS. 1-2, in accordance with certain embodiments.

Control starts at block 300, where the hardware device 102 sends a sequence of packets 200a . . . 200m to the device driver 110, and for each packet 200a . . . 200m indicates to the device driver 110, the corresponding protocol layer 106a . . . 106n that is capable of processing the packet.

The device driver 110 receives (at block 302) the packets 200a . . . 200m. The device driver sorts (at block 304) the received packets 200a . . . 200m into one or more packet bundles 202a . . . 202n based on the protocol layer capable of processing each of the received packets 200a . . . 200m, such that, all packets sorted into a packet bundle are capable of being processing by the same protocol layer and different packet bundles may be capable of being processed by different protocol layers.

The device driver 110 sends (at block 306) the packet bundles 202a . . . 202n to the operating system interface 108. The operating system interface 108 forwards (at block 308) the packet bundles 202a . . . 202n to the corresponding protocol layer 106a . . . 106n for processing.

FIG. 3 illustrates certain embodiments, in which the device driver 110 sorts the received packets 200a . . . 200m into packet bundles 202a . . . 202n, where each packet bundle includes packets that are capable of being processed by the same protocol and different packet bundles includes packets that may be processed by different protocols. The device driver sends the packet bundles 202a . . . 202n to the operating system interface 108, and the operating system interface 108 forwards the packets bundles 202a . . . 202n to the corresponding protocol layer 106a . . . 106n for processing.

Figure 4:
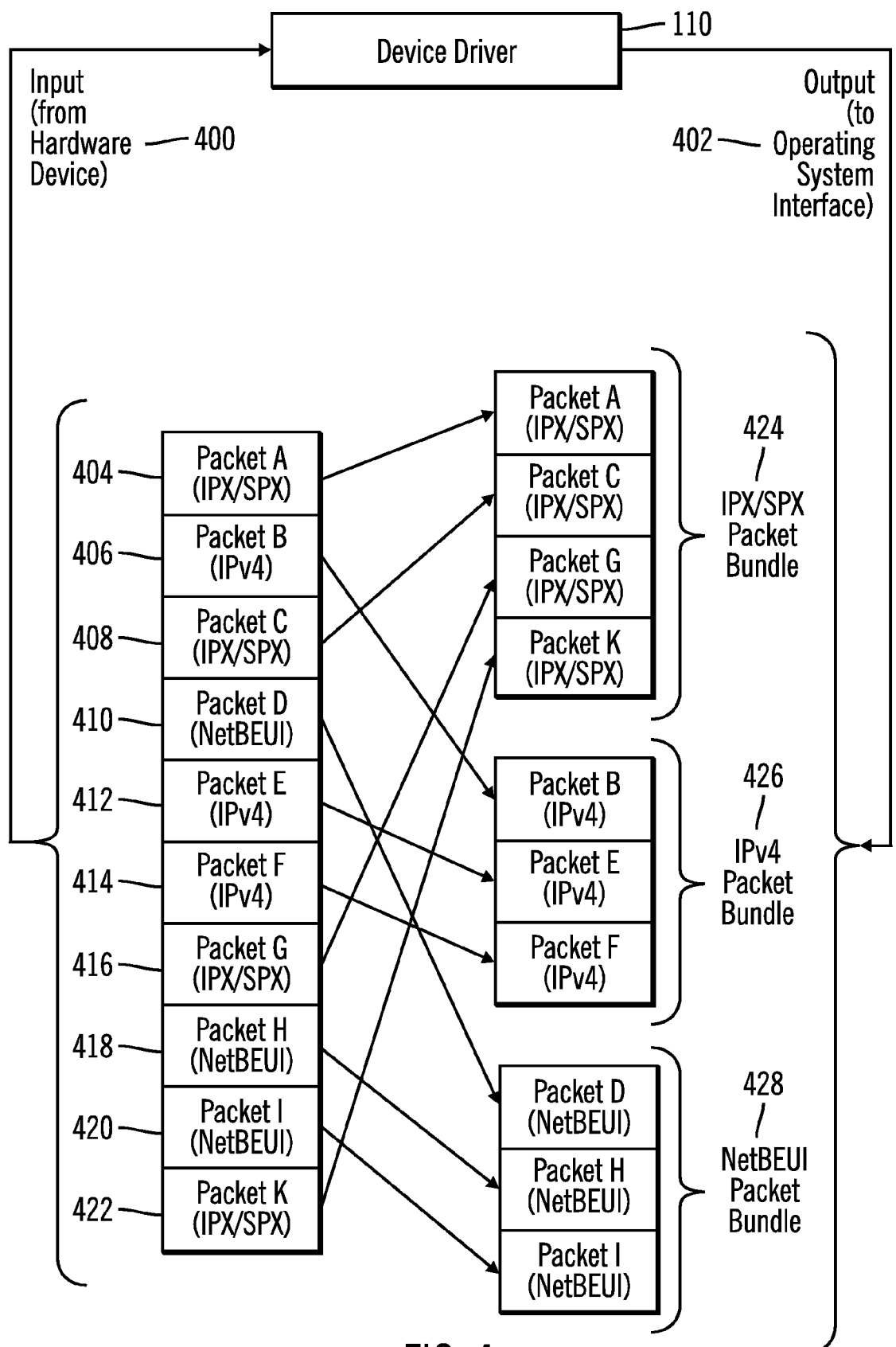
FIG. 4 illustrates an exemplary grouping of packets, in accordance with certain embodiments.

FIG. 4 illustrates an exemplary grouping of packets by the device driver 110, in accordance with certain embodiments.

The device driver 110 takes an input 400 from the hardware device 102 and sends an output 402 to the operating system interface 108, where in certain embodiments the input 400 includes packets 404, 406, 408; 410, 412, 414, 416, 418, 420, 422, where each packet is capable of being processed by one protocol layer, such as, IPX/SPX, NetBEUI, or IPv4. For example, Packet A 404 is capable of being processed by the IPX/SPX protocol. The device driver 110 sorts the packets in the input 400 into three groups based on the protocol capable of processing the packets in the input 400.

For example, in certain embodiments the device driver 110 may determine that packets 404, 408, 416, 420 are capable of being processed by the IPX/SPX protocol layer, packets 406, 412, 414 are capable of being processed by the IPv4 protocol layer, and packets 410, 418, 420 are capable of being processed by the NetBEUI protocol layer. The device driver 110 may sort the packets received in the input 400 into an IPX/SPX packet bundle 424 that includes the packets 404, 408, 416, 420, an IPv4 packet bundle 426 that includes the packets 406, 412, 414, and a NetBEUI packet bundle 428 that includes the packets 410, 418, 420. The device driver 110 sends the output 402, comprising the packet bundles 424, 426, 428, to the operating system interface 108.

FIG. 4 illustrates an exemplary embodiment in which the device driver 110 sorts packets into a plurality of packet bundles, where each packet bundle includes packets that can be processed by the same protocol layer, and different packet bundles include packets that may be processed by different protocol layers. The device driver 110 forwards the packet bundles to the operating system interface 108.

Figure 5:
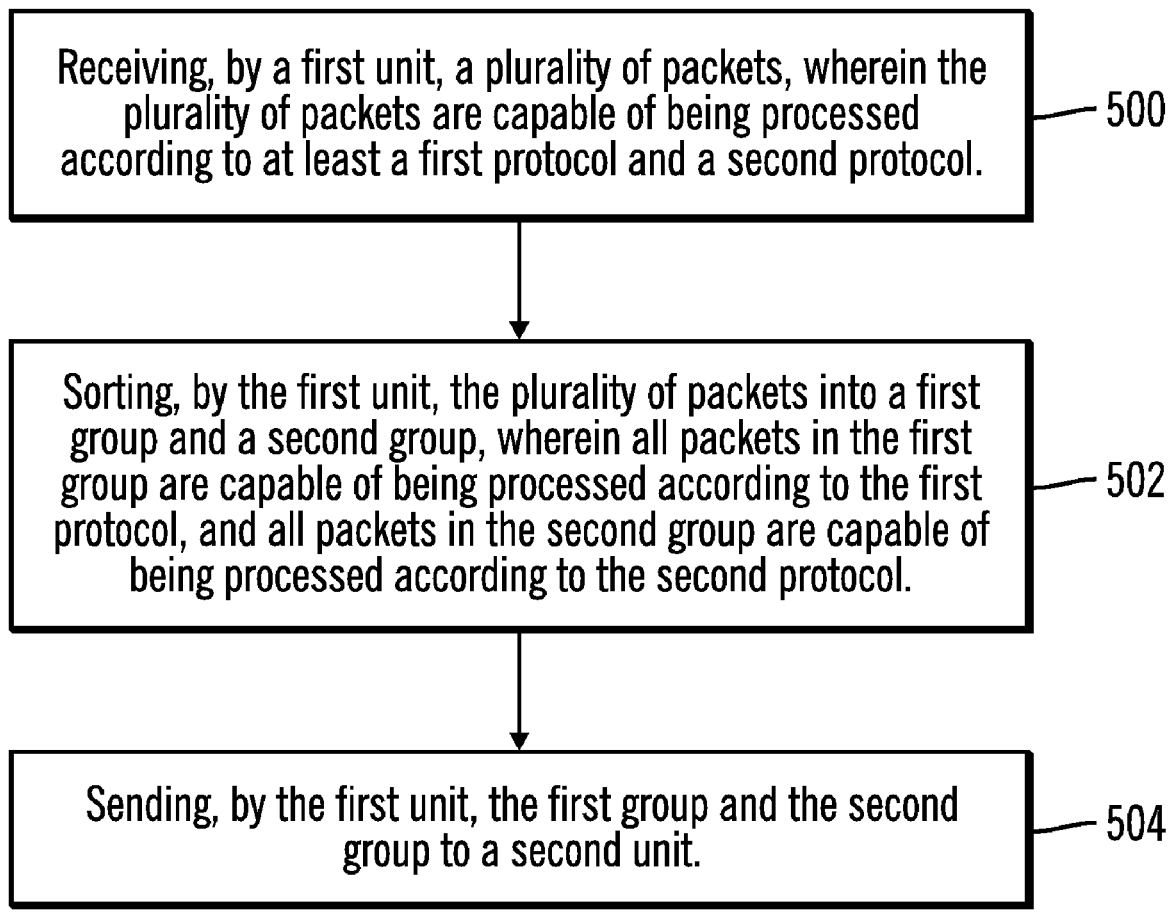
FIG. 5 illustrates operations implemented in accordance with certain embodiments.

FIG. 5 illustrates operations for grouping packets implemented in the computing environment 100, in accordance with certain embodiments. In certain embodiments, the operations may be implemented in the device driver 110, whereas in other embodiments the operations may be implemented in the hardware device 102.

Control starts at block 500, where a first unit receives a plurality of packets, wherein the plurality of packets are capable of being processed according to at least a first protocol and a second protocol. In certain embodiments the first unit is the device driver 110. In certain embodiments, the first unit is the hardware device 102.

The first unit sorts (at block 502) the plurality of packets into a first group and a second group, wherein all packets in the first group are capable of being processed according to the first protocol, and all packets in the second group are capable of being processed according to the second protocol.

The first unit sends (at block 504) the first group and the second group to a second unit. In certain embodiments, in which the first unit the device driver 100, the second unit may comprise the operating system interface 108. In certain other embodiments, the first unit may be the hardware device 102 and the second unit may comprise the device driver 110. In such a case, the device driver 110 does not have to parse the incoming packets for the operating system interface 108. In certain additional embodiments, the first unit may be the hardware device 102 and the second unit may comprise the operating system interface 108.

Certain embodiments group received packets by protocol type. The groups of packets are sent to corresponding protocol layers for processing. If the operating system interface 108 supports multi-packet API's for transmitting and receiving packets, the embodiments may use the features of the operating system interface.

The embodiments maintain packet orders within any given end-to-end communication such as a TCP connection. The embodiments generate fewer calls to packets arrival APIs of the protocol layers because packets are bundled together. The device driver generated packet bundles can be forwarded to the protocol layers without sending individual packets.

Certain embodiments allow systems, such as, servers, that may receive heterogeneous packets from various systems in an interleaved manner to take advantage of the multi-packet APIs of the operating system interface 108, such as, NDIS 6.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art.

Figure 6:
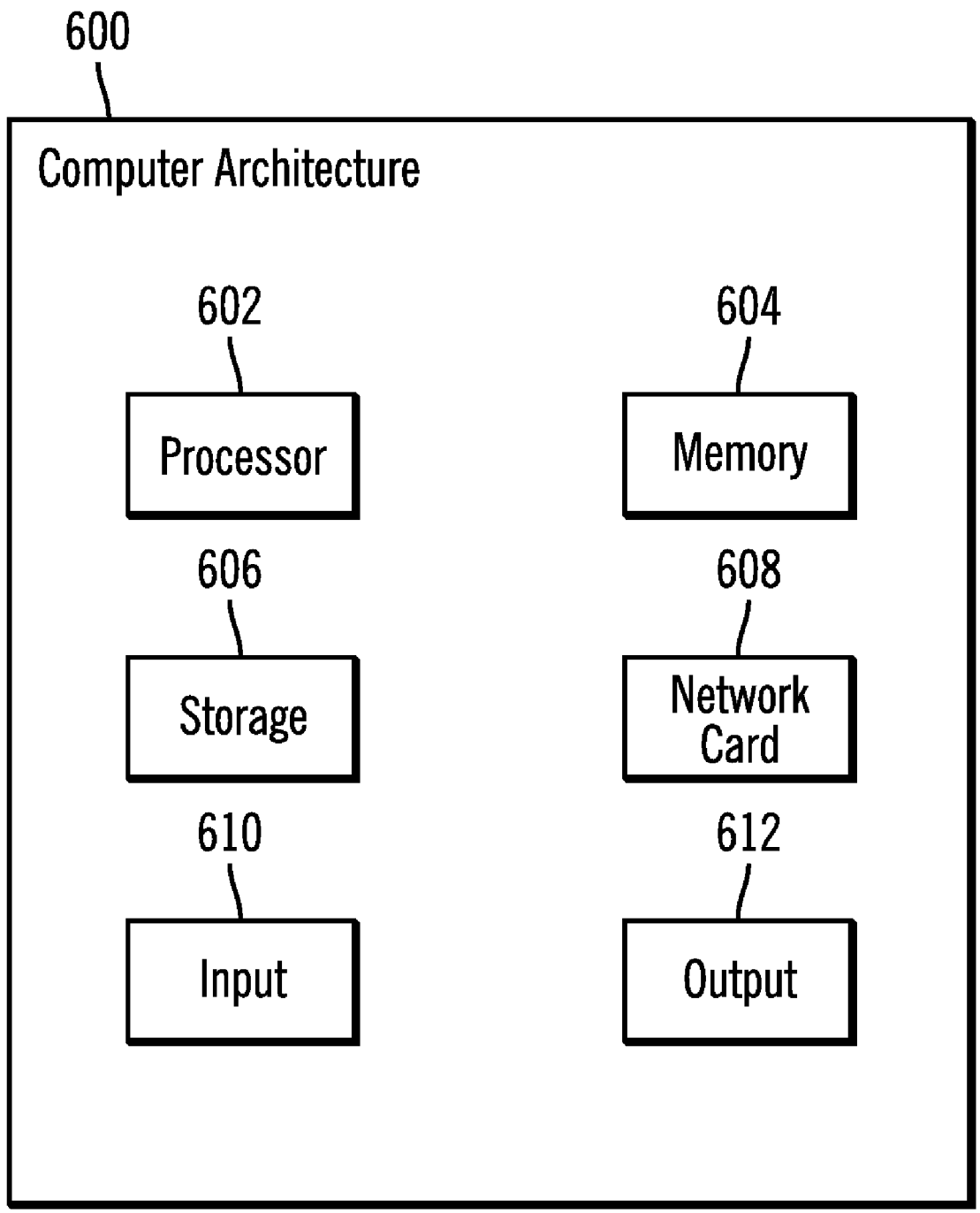
FIG. 6 illustrates a computer architecture in which certain described embodiments are implemented.

FIG. 6 illustrates a block diagram of a computer architecture in which certain embodiments are implemented. FIG. 6 illustrates one embodiment of the host system 104 and certain elements of the hardware device 102. The host system 104 and the hardware 102 may implement a computer architecture 600 having a processor 602, a memory 604 (e.g., a volatile memory device), and storage 606. Not all elements of the computer architecture 600 are found in the host system 104 and the hardware device 102. The storage 606 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 606 may comprise an internal storage device, an attached storage device and/or a network accessible storage device. Programs in the storage 606 may be loaded into the memory 604 and executed by the processor 602 in a manner known in the art. The architecture may further include a network card 608 to enable communication with a network. The architecture may also include at least one input device 610, such as a keyboard, a touchscreen, a pen, voice-activated input, etc., and at least one output device 612, such as a display device, a speaker, a printer, etc.

In certain embodiments, the device 102, such as, a network adapter may be included in a computer system including any storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative embodiments, the device 102 may be included in a system that does not include a storage controller, such as certain hubs and switches.

Certain embodiments may be implemented in a computer system including a video controller to render information to display on a monitor coupled to the computer system including the device 102, such as, a network adapter, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIGS. 3 and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components. In certain embodiments the network adapter may be a specialized part of the central processing unit of the host system.

The data structures and components shown or referred to in FIGS. 1-6 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving, by a hardware device, a plurality of packets;
   forwarding the plurality of packets, by the hardware device, to a device driver corresponding to the hardware device, wherein the hardware device indicates which protocols are capable of processing the plurality of packets to the device driver;
   receiving, by the device driver, the plurality of packets, wherein the plurality of packets are capable of being processed according to at least a first protocol and a second protocol;
   sorting, by the device driver, the plurality of packets into a first group and a second group, wherein all packets in the first group are capable of being processed according to the first protocol, and wherein all packets in the second group are capable of being processed according to the second protocol;
   sending, by the device driver, the first group and the second group to an operating system interface;
   forwarding, by the operating system interface, the first group to a first protocol layer that is capable of processing the first group according to the first protocol; and
   forwarding, by the operating system interface, the second group to a second protocol layer that is capable of processing the second group according to the second protocol.

2. The method of claim 1, wherein the hardware device comprises a network adapter, wherein the operating system interface comprises a multi-protocol application programming interface, and wherein the sorting further comprises:
   determining, by the device driver, from information associated with one packet of the plurality of packets that the one packet is capable of being processed according to the first protocol; and
   associating the one packet with the first group.

3. The method of claim 1, wherein the hardware device is coupled to a host system, and wherein the device driver is implemented in the host system.

4. The method of claim 1, wherein the operating system interface includes application programming interfaces for handling transmit and receive operations corresponding to a plurality of protocols including the first protocol and the second protocol.

5. The method of claim 1, wherein the first protocol comprises an Internet Protocol version 4 and the second protocol comprises an Internet Protocol version 6.

6. A hardware device, comprising:
   a processing unit;
   program logic including code capable of causing the processing unit to perform:
   (i) receiving, a plurality of packets; and
   (ii) forwarding the plurality of packets to a device driver corresponding to the hardware device, wherein the hardware device indicates which protocols are capable of processing the plurality of packets to the device driver, wherein the device driver receives the plurality of packets, wherein the plurality of packets are capable of being processed according to at least a first protocol and a second protocol, wherein the device driver sorts the plurality of packets into a first group and a second group, wherein all packets in the first group are capable of being processed according to the first protocol, wherein all packets in the second group are capable of being processed according to the second protocol, wherein the device driver sends the first group and the second group to an operating system interface, wherein the operating system interface forwards the first group to a first protocol layer that is capable of processing the first group according to the first protocol, and wherein the operating system interface forwards the second group to a second protocol layer that is capable of processing the second group according to the second protocol.

7. The hardware device of claim 6, wherein the hardware device is a network adapter, wherein the operating system interface comprises a multi-protocol application programming interface, and wherein the device driver determines from information associated with one packet of the plurality of packets that the one packet is capable of being processed according to the first protocol and the device driver associates the one packet with the first group.

8. The hardware device of claim 6, wherein the hardware device is a network controller coupled to a host system, and wherein the device driver is implemented in the host system.

9. The hardware device of claim 6, wherein the operating system interface includes application programming interfaces for handling transmit and receive operations corresponding to a plurality of protocols including the first protocol and the second protocol.

10. The hardware device of claim 6, wherein the first protocol comprises an Internet Protocol version 4 and the second protocol comprises an Internet Protocol version 6.

11. A system, comprising:
    a computational platform;
    a data storage coupled to the computational platform;
    a data storage controller to manage Input/Output access to the data storage, wherein the data storage is coupled to the computational platform;
    code configured to implement device driver in the computational platform; and
    a hardware device coupled to the computational platform, wherein the hardware device is capable of receiving a plurality of packets, wherein the hardware device is capable of forwarding the plurality of packets to a device driver corresponding to the hardware device, wherein the hardware device is capable of indicating which protocols are capable of processing the plurality of packets to the device driver, wherein the device driver receives the plurality of packets, wherein the plurality of packets are capable of being processed according to at least a first protocol and a second protocol, wherein the device driver sorts the plurality of packets into a first group and a second group, wherein all packets in the first group are capable of being processed according to the first protocol, wherein all packets in the second group are capable of being processed according to the second protocol, wherein the device driver sends the first group and the second group to an operating system interface, wherein the operating system interface forwards the first group to a first protocol layer that is capable of processing the first group according to the first protocol, and wherein the operating system interface forwards the second group to a second protocol layer that is capable of processing the second group according to the second protocol.

12. The system of claim 11, wherein the hardware device comprises a network adapter, wherein the operating system interface comprises a multi-protocol application programming interface, and wherein the device driver determines from information associated with one packet of the plurality of packets that the one packet is capable of being processed according to the first protocol and the device driver associates the one packet with the first group.

13. A non-transitory computer readable storage medium having stored therein code, wherein the code when executed by a processor causes operations, the operations comprising:
receiving, by a hardware device, a plurality of packets;
forwarding the plurality of packets, by the hardware device, to a device driver corresponding to the hardware device, wherein the hardware device indicates which protocols are capable of processing the plurality of packets to the device driver;
receiving, by the device driver, the plurality of packets, wherein the plurality of packets are capable of being processed according to at least a first protocol and a second protocol;
sorting, by the device driver, the plurality of packets into a first group and a second group, wherein all packets in the first group are capable of being processed according to the first protocol, and wherein all packets in the second group are capable of being processed according to the second protocol;
sending, by the device driver, the first group and the second group to an operating system interface;
forwarding, by the operating system interface, the first group to a first protocol layer that is capable of processing the first group according to the first protocol; and
forwarding, by the operating system interface, the second group to a second protocol layer that is capable of processing the second group according to the second protocol.

14. The computer readable storage medium of claim 13, wherein the hardware device comprises a network adapter, wherein the operating system interface comprises a multi-protocol application programming interface, and wherein the sorting further comprises:
determining, by the device driver, from information associated with one packet of the plurality of packets that the one packet is capable of being processed according to the first protocol; and
associating the one packet with the first group.

15. The computer readable storage medium of claim 13, wherein the hardware device is coupled to a host system, and wherein the device driver is implemented in the host system.

16. The computer readable storage medium of claim 13, wherein the operating system interface includes application programming interfaces for handling transmit and receive operations corresponding to a plurality of protocols including the first protocol and the second protocol.

17. The computer readable storage medium of claim 13, wherein the first protocol comprises an Internet Protocol version 4 and the second protocol comprises an Internet Protocol version 6.

* * * * *